United States Patent [19]

Kool

[11] 3,942,885

[45] Mar. 9, 1976

[54] MICROFICHE READER
[75] Inventor: Bram Kool, Saratoga, Calif.
[73] Assignee: Microform Data Systems, Inc., Mountain View, Calif.
[22] Filed: Sept. 9, 1974
[21] Appl. No.: 504,420

Related U.S. Application Data
[63] Continuation-in-part of Ser. No. 182,813, Sept. 22, 1971, abandoned.

[52] U.S. Cl. .............................................. 353/27 R
[51] Int. Cl.² G03B 21/11; G03B 21/14; G03B 23/08
[58] Field of Search ........................... 353/25, 27, 60

[56] References Cited
UNITED STATES PATENTS

| 2,159,616 | 5/1939 | Kleerup | 353/27 |
| 3,424,524 | 1/1969 | Akiyama et al. | 353/27 |
| 3,720,462 | 3/1973 | Dali et al. | 353/27 |
| 3,799,662 | 3/1974 | Veda et al. | 353/27 |

FOREIGN PATENTS OR APPLICATIONS

| 597,245 | 8/1959 | Italy | 353/27 |
| 241,690 | 10/1925 | United Kingdom | 353/60 |
| 960,737 | 11/1949 | France | 353/27 |

OTHER PUBLICATIONS
IBM Technical Disclosure Bt., F. W. Landsiedel et al., "Constant Focus Image Projection" Vol. 13, No. 7, 12/70.

Primary Examiner—Harry N. Haroian
Attorney, Agent, or Firm—Townsend and Townsend

[57] ABSTRACT

A reader in which mircofiche film is manually moved in a rectilinear fashion by moving the film with respect to a holder in the first direction and moving the holder in a perpendicular second direction. The holder includes a light passage slot. A light source is mounted beneath the holder and an image projecting and enlarging optic is mounted in alignment with the source above the holder. A low friction annular spacer such as a Teflon O-ring rests directly on the film, is concentric with the optic and accurately spaces the optic from the film while maintaining film beneath the optics taut to assure proper image focusing. Film indexing is performed by moving the film while the optic supporting Teflon O-ring remains in contact with the film.

7 Claims, 4 Drawing Figures

MICROFICHE READER

This is a continuation-in-part of application Ser. No. 182,813, filed September 22, 1971, now abandoned.

BACKGROUND OF THE INVENTION

Various microfiche readers are known. They usually comprise a light source, image enlarging and projecting optics aligned with light source and a film holder therebetween. A mechanical or electro mechanical transport mechanism is also provided for moving the film holder rectilinearly and indexing the film.

A glass plate is placed between the film and the optics, protects the film from contact and/or damage by the optics and securely clamps the film to the holder. It also provides the means for controlling the spacing between optics and the film surface.

The holder moving mechanism is relatively complicated and expensive to construct since the film holding table must be linearly movable in two perpendicular directions. Additionally, the film clamping and protecting glass plate prevents an accurate gauging of film surface irregularities so that the film optics is positioned at an average distance between the lens and the film surface rather than at the actual distance between the film surface and the optics which may vary due to film surface irregularities and the like. Since the magnification factor of the optics is usually several hundred times, even slight film surface irregularities may prevent accurate focusing or, alternatively, require a resetting of the optics each time the microfiche film is newly indexed. This is time consuming and inconvenient.

In spite of such shortcomings, microfiche readers continue to be constructed along these lines. It appears that in the past it was thought necessary or at least desirable to maintain the film taut and flat by compressing it with a glass plate. Furthermore, such glass plates provided convenient means for spacing the optics from the film and fairly accurately controlling such spacing although, as pointed out above, precise spacing is not possible.

SUMMARY OF THE INVENTION

The present invention departs from past practices and eliminates heretofore encountered shortcomings while it substantially simplifies the construction and thus lowers the cost of microfiche readers. This is accomplished by eliminating the film clamping glass plate and mounting the film alone in a holder. The holder permits relative linear film movements in a first direction and is itself movable in a perpendicular, second direction to thus provide the necessary rectilinear film movement for indexing. Since the film is now freely movable with respect to the holder, intricate mechanical holder movement mechanisms which were commonly found on prior art readers can be eliminated.

Moreover, the image enlarging and projecting optics is now directly supported on and spaced from the film by providing it with a preferably ring-shaped spacer constructed of a non-smudging, non-staining and non-scratching material having a relatively low coefficient of friction such as Teflon.

The Teflon ring is mounted about the optics concentrically with the optical axis therethrough and is supported on the film which rests on a flat plate of the holder. The flat plate includes a longitudinal slot that extends in the second direction and is aligned with the optical axis through the optic and the light source.

The optic is biased against the ring and the ring in turn is directly biased against the film and the supporting plate. This biasing force maintains a portion of the film underlying the optic taut and, therefore, flat and even. Furthermore, surface irregularities of the film, local variations in the film thickness and the like which can change the effective spacing between the film surface and the optic are automatically taken into account and result in a corresponding adjustment of the relative position of the optic. Heretofore common refocusing after the film was indexed is no longer necessary.

In the preferred embodiment of the invention, the Teflon ring has a round, e.g. semi-circular surface facing towards the microfiche to prevent pressure concentrations and possible wear of the microfiche surface as could occur if the ring had sharp corners or edges rubbing against the moving film. The ring further has a diameter greater than the width of the light transmitting slot to provide adequate support for it.

DESCRIPTION OF THE PREFERRED EMBODIMENTS

Figure 1:
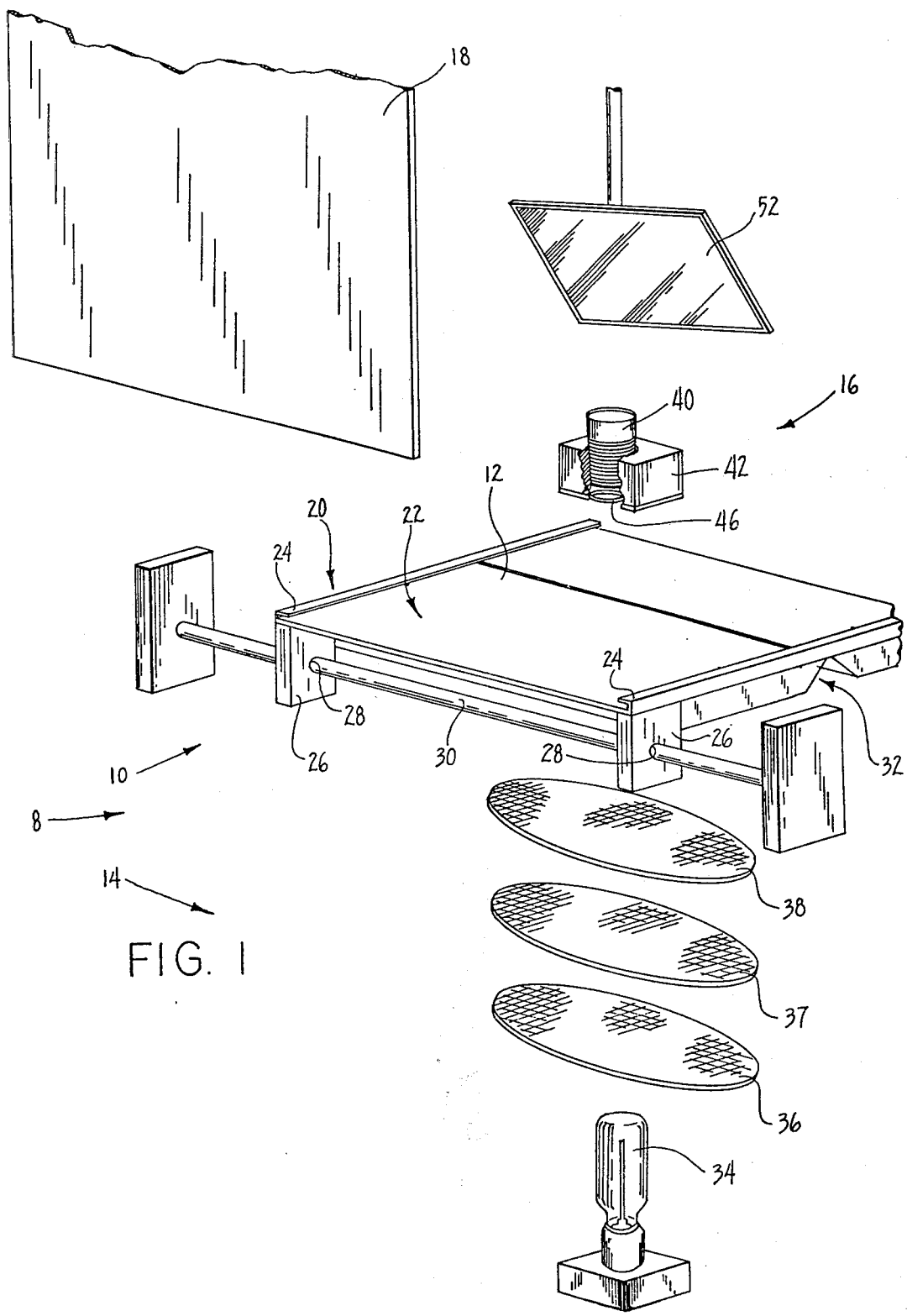
FIG. 1 is a schematic, exploded perspective side elevational view of a microfiche reader constructed in accordance with the invention.

Referring first to FIG. 1, a microfiche reader 8 constructed in accordance with the invention broadly comprises a holding and moving device 10 for microfiche film 12, a light source 14, and an image enlarging and projecting optic 16 for projecting an enlarged image of a portion of the film on viewing screen 18. The light source and optic per se are conventional and only broadly described herein. The invention concerns itself principally with the manner in which the microfiche film is mounted and moved including the manner in which the optic is spaced from the film to obtain proper focusing.

Still referring to FIG. 1, film 12 is mounted to a holder 20 that comprises a flat support plate 22 and a pair of opposing guide rails 24 that extend in a first direction. Film 12 can be slidably inserted into the guide rails and linearly moved with respect to the support plate in the rails. The rails also retain the film to the support plate.

Holder 20 includes two sets (only one set is shown in the drawings) of spaced apart bearing blocks 26 that have aligned apertures 28 through which an elongate, straight slide bar 30 extends in a second direction perpendicular to the first direction. This permits free slidable movements of the holder in the second direction. Thus, the film can be rectilinearly moved.

Figure 2:
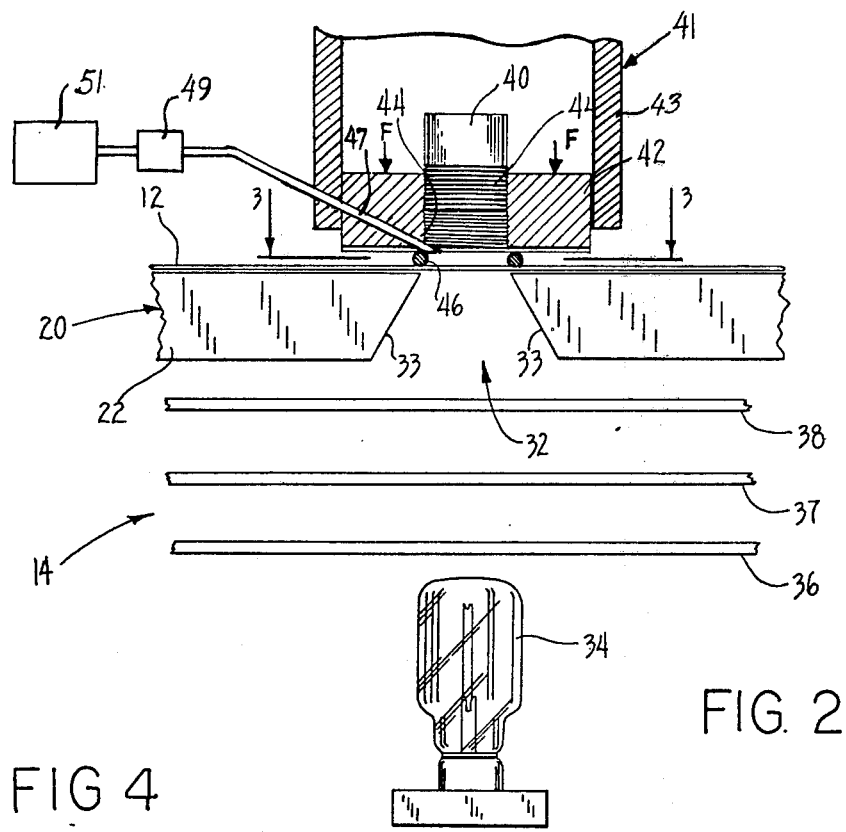
FIG. 2 is an enlarged side elevational view, in section, along a plane intersecting the optical axis between the light source and the image enlarging and projecting optics.
Figure 4:
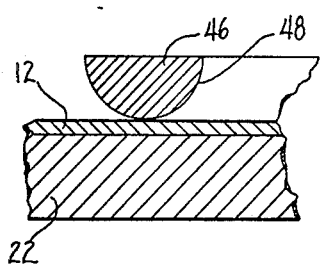
FIG. 4 is an enlarged, cross-sectional view of the optic supporting ring biased against the microfiche and the underlying support table of the film holder and is taken on line 4—4, FIG. 3.

Referring to FIGS. 1 and 2, support plate 22 includes a narrow, elongate slot 32 that extends over the full width of the slot between guide rails 24 in the second direction. The slot is parallel to slide bar 30 and perpendicular to guide rails 24 and has two upwardly converging tapered surfaces 33 to prevent undesirable reflections or light diffraction on the overlying film. A high intensity lamp 34 of light source 14 is mounted in alignment with slot 32 beneath support plate 22. A plurality of infrared heat filters 36, 37 and 38 are preferably disposed between the light source and the support plate to remove heat rays from the light and limit light passing through slot 32 to light in the visible spectrum.

An optic 16 is suitably mounted to a support structure 41 above support plate 22 in optical alignment with lamp 34 and slot 32. Broadly the optic comprises a lens system 40 and a suitable lens support 42 that includes means such as threads 44 for focusing the lens by moving it in an axial direction. A ring-shaped spacer 46 that has a circular or semi-circular cross-section is suitably secured to the underside of the support as by bonding it thereto. The spacer is disposed about and concentric with an aperture 50 of the lens support that receives lens 40. The ring has a rounded surface 48 that faces towards the underlying microfiche film 12. The spacer has a diameter greater than the width of slot 32 in film support plate 22 to provide it with a bearing surface when it is aligned with the slot and the optical axis therethrough.

The support structure 41 permits vertical movement of the optic 16 so that spacer 46 can be biased against the film. Thus, the support structure may comprise a hollow tubular member 43 in which the optic is freely removable. The weight of the optics supplies biasing force "F" which biases the optics towards film 12 and the spacer into intimate contact with the film. If desired, springs (not shown) or the like can be provided to increase the biasing force.

If desired, air under a small pressure can be directed into the space within spacer 46 by way of a conduit 47 extending through lens support 42 and support structure 41 as shown in FIG. 2. Conduit 47 can be coupled by a suitable control 49 to an air pressure source 51. A flow of air into the space within spacer 46 operates to reduce dust accumulation on film 12 and keep it free of dust. Since the film is unsupported from below due to slot 32, there is no dust below the film. Thus, the film is properly positioned with respect to the focal plane of the optics.

Turning now to the use of the microfiche reader 8 of the present invention, a film 12 is first placed on holder 20 by guiding it into rails 24 until the film overlies slot 32 in support plate 22. The desired portion of the film to be viewed is then indexed with the optical axis through optic 16 and light source 14 by manually touching the upwardly facing surface of the film. The film is then moved in either or both directions by applying the necessary force to it to move the film in the holder and/or the holder along slide bars 30. The indexing itself is conventionally performed by providing the film, the holder and/or the support structure (not shown) with proper indexing and referencing marks (not shown) so that any desired square or area on the film can be located by referring to its respective bar and column reference numerals.

Figure 3:
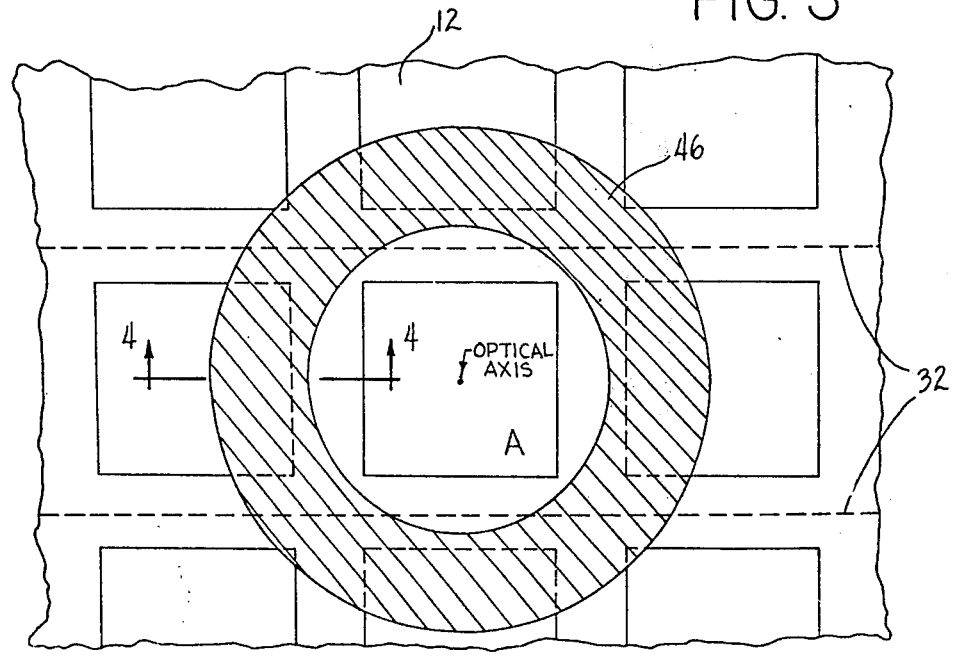
FIG. 3 is a fragmentary, enlarged plan view of a portion of the microfiche film and the optic supporting low friction ring that is taken on line 3—3 of FIG. 2.

Referring now to FIGS. 1 through 4, once the proper film portion, say square A shown in FIG. 3, is aligned with the optical axis, lamp 34 is turned on so that it directs light past the heat filters, slot 32, and onto the film for projection of the information contained in square A on screen 18 via mirror 52. If further information is desired from the same film, it is simply moved in the aforementioned manner until the desired information square is indexed with the optical axis.

It will be observed that since optic 16 is biased downwardly towards the film and spacer 46 is in direct contact with the film and presses it against the underlying support plate 22, the film portion (including square A in FIG. 3) is maintained taut, that is flat and even without waviness or curvature. This effectively maintains the optical spacing between lens system 42 and the film over the full exposed film area (e.g., square A) constant to facilitate focusing and prevent portions of the exposed film surface from being out of focus due to film unevenness. In the past, the above described film clamping glass plate was necessary to keep the film flat.

Furthermore, the ring-shaped spacer 46 rests directly on the film and can take surface irregularities such as variations in the film thickness directly into account. That is, since the spacer is pressed against the film until the latter rests on support plate 22 and since the spacer is directly secured to optic 16, the latter follows ring movements in the direction of the optical axis due to such surface irregularities. The heretofore possible loss of focusing due to differences between the actual spacing between the exposed film surface and the lens and the "average" spacing between the two are greatly reduced or eliminated.

The construction of a spacer 46 per se is preferably as indicated above, i.e., by constructing it with a circular or semi-circular cross-section and forming the downwardly facing surface contacting the film round, i.e., semi-circular. This is to prevent the formation of pressure concentrations due to edges, ridges, sharp corners and the like. However, good results can also be obtained by constructing the rounded surface elliptical or otherwise round to prevent surface damage from pressure concentrations.

As to the material employed for spacer 46, it is preferred to use semi-rigid plastic materials such as Teflon which have a low coefficient of friction and which are non-smudging, non-staining and non-scratching. Properly treated and formed other materials such as other plastics or well shaped, i.e., well rounded and polished metals can also be employed. In the latter instance, it is mandatory, however, to assure a clean surface and prevent film scratches from dust particles and the like wedging between the metal spacer and the underlying film.

Although the film indexing is described and shown as a rectilinear film indexing, it is also possible to combine linear film motion in one direction with a perpendicular, curved film motion in the other direction. If desired, both film movements can be curved, e.g., circular.

I claim:

1. A microfiche film reader comprising: a film support having a flat surface at one side thereof, a pair of opposed end margins, a slot through the support and extending between the end margins, and means at said end margins for retaining a microfiche film directly adjacent to and in engagement with said flat surface in a position with a portion of the film spanning the width of the slot; a light source on the opposite side of the support in alignment with the slot and positioned to direct light therethrough and through the portion of the film spanning the slot when the film is retained directly on and in engagement with said flat surface; a lens; means mounting the lens adjacent to said one side of the support in optical alignment with the slot and the light source; a continuous spacer secured to the lens mounting means and engageable with the adjacent surface of the film when the latter is in said position, the spacer being concentric with respect to the optical axis of the lens and being movable into engagement with the film at locations adjacent to the sides of the slot for maintaining the film portion spanning the slot substantially taut for the focused projection and enlargement of the image of the film portion by the lens, said lens mounting means having structure for biasing the spacer toward the flat surface.

2. A reader according to claim 1, wherein the spacer is constructed of Teflon and has a convex, outer, film-engaging surface.

3. A reader according to claim 1, wherein the spacer means is constructed of a non-smudging, non-staining material having a relatively low coefficient of friction, wherein the spacer includes a rounded surface facing and engageable with the film, and including means for moving the film while contacted by the spacer means relative to the lens means in a plurality of directions for centering different film portions with the lens means.

4. A reader as set forth in claim 1, wherein said lens mounting means has means for directing a flow of air into the space within the ring.

5. A reader as set forth in claim 1, wherein is included infrared filter means between the light source and said support.

6. A reader as set forth in claim 1, wherein said support has a pair of beveled faces on said opposite side of the support and on opposite sides of the slot.

7. A microfiche reader comprising: a microfiche film holder having a flat surface on one side thereof, a pair of opposed end margins, a slot extending substantially between said end margins, and means at said end margins for retaining the film on the holder in a position with a portion of the film spanning the slot, said retaining means permitting film movement relative to the holder in a direction perpendicular to the slot; means coupled with the holder for moving the same parallel to the slot, whereby any one of a number of film portions can be moved into spanning relationship to the slot; a light source on the opposite side of the holder and aligned with the slot for directing light perpendicular to the film through the slot and a film portion spanning the slot; projection optics; means mounting said optics on said one side of the holder with the optics being optically aligned with the light source and a film portion spanning the slot when the film is retained on the holder; a continuous spacer having a convex, outer, film-engaging surface and carried by the optics mounting means concentrically with the optical axis of said optics, said spacer being engageable with the film along a continuous line thereon and at locations directly adjacent to the sides of the slot when the film is retained on the holder, the spacer being constructed of a material having a relatively low coefficient of friction; means biasing the spacer into engagement with the film at said locations to thereby cause a film portion spanning the slot to become and to be maintained substantially taut, whereby the film portion is automaically flattened and in focus while relative motions between the film and the spacer are permitted to position different film portions in optical alignment with the optics; and means carried by said optics mounting means for directing a flow of air into the space within the ring.

* * * * *